US008297851B2

(12) United States Patent
Nishimura et al.

(10) Patent No.: US 8,297,851 B2
(45) Date of Patent: Oct. 30, 2012

(54) OPTICAL CONNECTOR

(75) Inventors: Naoya Nishimura, Tokyo (JP); Hideki Miyazaki, Tokyo (JP)

(73) Assignee: Furukawa Electric Co., Ltd., Tokyo (JP)

( * ) Notice: Subject to any disclaimer, the term of this patent is extended or adjusted under 35 U.S.C. 154(b) by 236 days.

(21) Appl. No.: 12/933,266

(22) PCT Filed: Mar. 4, 2009

(86) PCT No.: PCT/JP2009/054021
§ 371 (c)(1),
(2), (4) Date: Sep. 17, 2010

(87) PCT Pub. No.: WO2009/116389
PCT Pub. Date: Sep. 24, 2009

(65) Prior Publication Data
US 2011/0044586 A1 Feb. 24, 2011

(30) Foreign Application Priority Data
Mar. 18, 2008 (JP) .................................. 2008-068769

(51) Int. Cl.
*G02B 6/38* (2006.01)
(52) U.S. Cl. ................. 385/60; 385/56; 385/77; 385/78; 385/114
(58) Field of Classification Search .................... 385/53, 385/56, 60, 71, 76, 77, 78, 100, 114, 139
See application file for complete search history.

(56) References Cited

U.S. PATENT DOCUMENTS

| 6,079,881 | A  | * | 6/2000  | Roth ................................ 385/76 |
| 6,081,647 | A  | * | 6/2000  | Roth et al. ..................... 385/139 |
| 6,866,424 | B2 | * | 3/2005  | Tanaka et al. ................... 385/55 |
| 7,211,739 | B1 | * | 5/2007  | Brigham ........................ 174/359 |
| 7,712,974 | B2 |   | 5/2010  | Yazaki et al. |
| 7,841,778 | B2 |   | 11/2010 | Nishimura et al. |
| 2011/0044586 | A1 | * | 2/2011 | Nishimura et al. ............. 385/60 |

FOREIGN PATENT DOCUMENTS

| JP | 63 239407   | 10/1988 |
| JP | 6 94940     | 4/1994  |
| JP | 8-262270    | 10/1996 |
| JP | 2000 56176  | 2/2000  |
| JP | 2007 121764 | 5/2007  |
| JP | 2007 133368 | 5/2007  |
| JP | 2008 191318 | 8/2008  |

OTHER PUBLICATIONS

Chinese Office Action issued Mar. 6, 2012, in Patent Application No. 200980109145.2 (with English-language translation).

* cited by examiner

*Primary Examiner* — Brian Healy
(74) *Attorney, Agent, or Firm* — Oblon, Spivak, McClelland, Maier & Neustadt, L.L.P.

(57) ABSTRACT

An optical connector 1 includes a plastic ferrule 4 that holds optical fibers 7, a plastic holder member 61 that holds the ferrule 4, a plastic plug 6 that is arranged outside the holder member 61, and a metal intermediate member 5 that is disposed between an outer surface of the holder member 61 and an inner surface of the plug 6.

3 Claims, 5 Drawing Sheets

US 8,297,851 B2

OPTICAL CONNECTOR

TECHNICAL FIELD

The present invention relates to an optical connector, and more particularly, to an optical connector in which a part of a housing of the optical connector is formed of a metal part.

BACKGROUND ART

With diversification and large capacity of communication, communication using an optical fiber such as FTTH (Fiber To The Home) has been rapidly spread. The optical fibers are connected to each other using an optical connector.

Constituent elements of a housing of the optical connector are made of plastic by injection molding and include a plastic ferrule, a holder member covering the plastic ferrule, a plastic intermediate member covering the holder member, and a plug arranged around the intermediate member.

A related technology of this kind of optical connector is disclosed in Patent Document 1.

Patent Document 1: Japanese Patent Application Laid-Open (JP-A) No. 63-239407

DISCLOSURE OF THE INVENTION

Problems to be Solved by the Invention

In the technology disclosed in Patent Document 1, however, in order to further reduce or increase the size of a unit of the ferrule and the holder member of the optical connector without modifying the size of the plug, the shape of the plastic intermediate member have to be modified to match with the reduced or increased size of the unit of the ferrule and the holder member. If the plastic intermediate member is thinned, the plastic intermediate member may be readily warped or distorted and the strength of the intermediate member may become weaker, thereby causing shape accuracy of the intermediate member to be low.

If the plastic intermediate member is warped or distorted, there is a possibility that a problem arises in fitting the unit of the ferrule and the holder member, the intermediate member, and the plug to one another when the unit of the ferrule and the holder member, the intermediate member, and the plug are assembled. Therefore, working efficiency may deteriorate when the units of the ferrule and the holder member, the intermediate member, and the plug are assembled.

Accordingly, to solve the above-mentioned problems, an object of the invention is to provide an optical fiber that can be readily assembled by forming an intermediate member of metal to ensure the strength of the intermediate member, even though the intermediate member is thinned.

Means for Solving Problems

In order to solve the above-mentioned problems, an optical connector according to the present invention connects optical fibers to each other and includes: a plastic ferrule that holds the optical fibers; a plastic holder member that holds the ferrule; a plastic plug that is arranged outside the holder member; and a metal intermediate member that is disposed between an outer surface of the holder member and an inner surface of the plug.

In the optical connector of the present invention, the ferrule may hold an optical fiber core wire of a multi-core fiber tape core wire.

In the optical connector of the present invention, the intermediate member may be formed by bending a metal plate.

Effect of the Invention

According to the present invention, an optical connector can readily be assembled by forming an intermediate member of metal to ensure the strength of the intermediate member, even though the intermediate member is thinned.

EXPLANATIONS OF LETTERS OR NUMERALS

Figure 1:
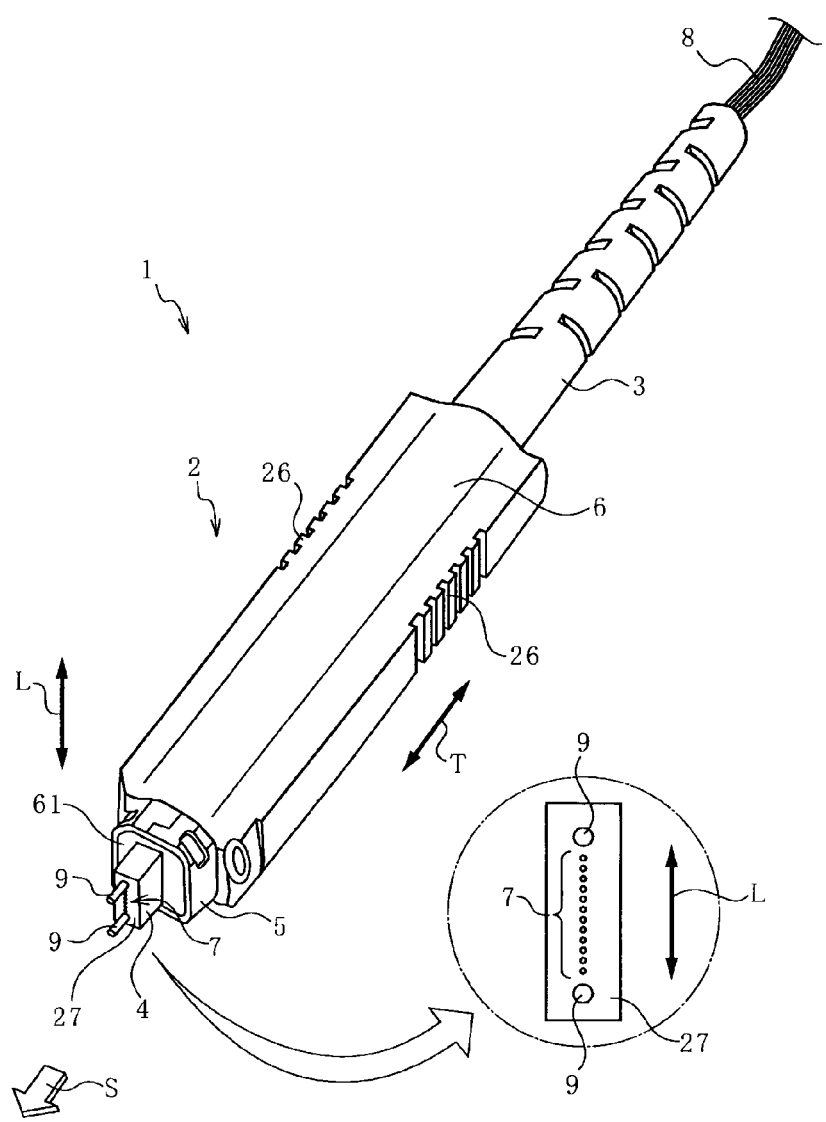
FIG. 1 is a perspective view illustrating a male optical connector according to a preferred embodiment of an optical connector of the invention.

1: optical connector
2: housing
3: boot
4: ferrule
5: intermediate member
6: plug
7: optical fiber core wire
8: multi-core fiber tape core wire
9: guide pin
10: frame
61: holder member

BEST MODE(S) FOR CARRYING OUT THE INVENTION

Hereinafter, preferred embodiments of the present invention will be described in detail with reference to the drawings.

Figure 2:
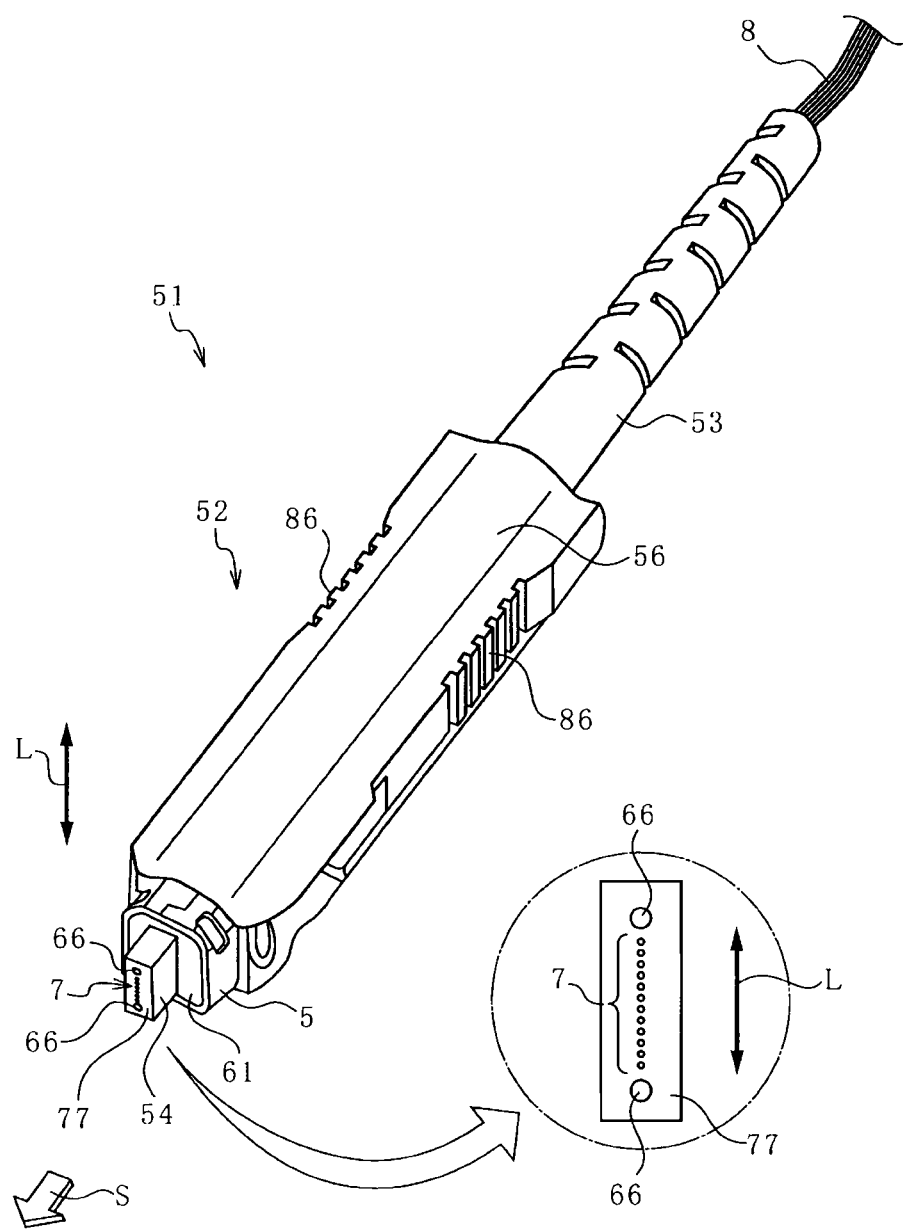
FIG. 2 is a perspective view illustrating a female optical connector according to a preferred embodiment an optical connector of the invention.

FIGS. 1 and 2 are perspective views illustrating optical connectors according to a preferred embodiment of the invention. An exemplary male optical connector is shown in FIG. 1 and an exemplary female optical connector to be connected to the male optical connector shown in FIG. 1 is shown in FIG. 2.

Figure 3:
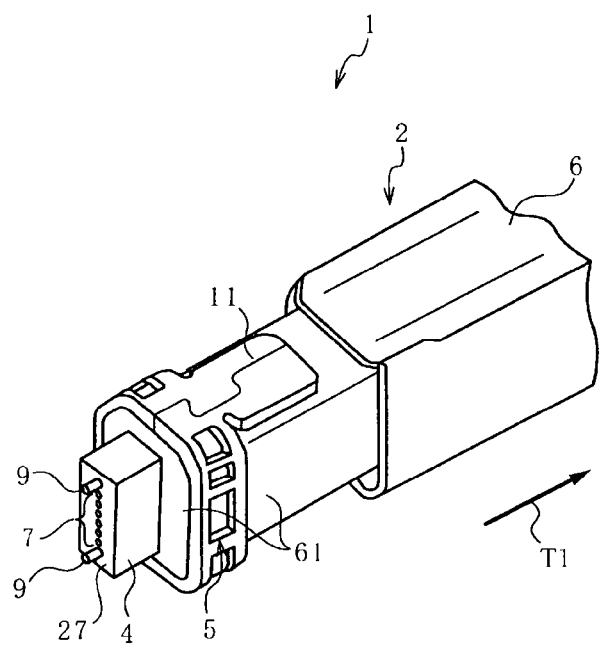
FIG. 3 is a perspective view illustrating a state where a plug of the male optical connector shown in FIG. 1 is shifted.
Figure 4:
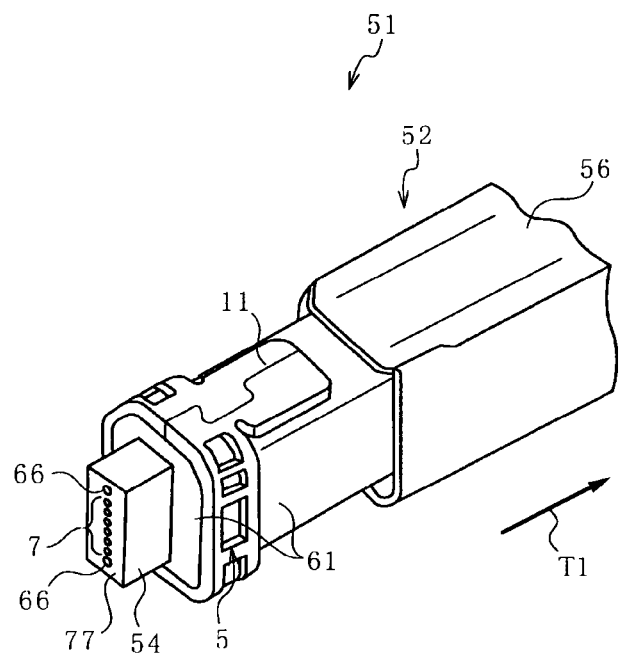
FIG. 4 is a perspective view illustrating a state where a plug of the female optical connector shown in FIG. 2 is shifted.

FIG. 3 is a perspective view illustrating a state where an intermediate member 5 and a holder member 61 are exposed by slightly shifting a plug 6 of the male optical connector 1 shown in FIG. 1 in a direction T1. FIG. 4 is a perspective view illustrating a state where an intermediate member 5 and a holder member 61 are exposed by slightly shifting a plug 56 of the female optical connector 51 shown in FIG. 2 in a direction T1.

The male optical connector 1 shown in FIG. 1 and the female optical connector 51 shown in FIG. 2 have substantially the same configuration.

First, the configuration of the male optical connector 1 will be described with reference to FIGS. 1 and 3.

As shown in FIG. 1, the male optical connector 1 includes a housing 2 and a boot 3 made of flexible plastic and led out from the housing 2. The boot 3 holds a multi-core fiber tape core wire 8. The housing 2 includes a ferrule 4, a plastic holder member 61 that covers the outer surface of the ferrule 4, the intermediate member 5 that is arranged on the outer surface of the holder member 61, and the plastic plug 6 that is arranged to cover the outer surface of the hold member 61 and the outer surface of the intermediate member 5 and is slidable relative to the holder member 61 and the intermediate member 5.

The ferrule 4 shown in FIGS. 1 and 3 is made of plastic by injection molding. On a ferrule end face 27 of the ferrule 4, connection end faces of plural optical fiber core wires 7 of the multi-core fiber tape core wire 8 are arranged in series in a direction L. On both sides of the plural optical fiber core wires 7, two guide pins 9 are disposed in parallel with protruding from the ferrule end face 27 in a direction S.

As shown in FIGS. 1 and 3, the plastic holder member 61 is arranged on the outer surface of the ferrule 4 and the intermediate member 5 is further arranged in a tip end of the outer surface of the holder member 61. The holder member 61 holds the ferrule 4 so as to cover the outer surface thereof, and the intermediate member 5 is arranged between the outer surface of the holder member 61 and the inner surface of the housing 2. The intermediate member 5 is fixed to the outer surface of the holder member 61 by the elastic force, for example.

The intermediate member 5 is formed of not plastic but metal. The intermediate member 5 is formed by bending a metal plate. Examples of the metal material of the intermediate member 5 include iron, aluminum, and brass, but the invention is not particularly limited thereto.

The plug 6 covers the outer surface of the intermediate member 5, as shown in FIG. 1, and can slide against an urging force of a spring (not shown) in the direction T along a guide rail formed in the holder member 61, for example. The plug 6 has a spatial part with a substantially rectangular cross-section surface. A gripping part 26 is formed in the middle portion of the plug.

Next, the configuration of the female optical connector 51 will be described with reference to FIGS. 2 and 4.

As shown in FIG. 2, the female optical connector 51 includes a housing 52 and a boot 53 made of flexible plastic and led out from the housing 52. The boot 53 holds a multi-core fiber tape core wire 8. The housing 52 includes a ferrule 54, a plastic holder member 61 that covers the outer surface of the ferrule 54, the intermediate member 5 that is arranged on the outer surface of the holder member 61, and the plastic plug 56 that is arranged to cover the outer surface of the hold member 61 and the outer surface of the intermediate member 5 and is slidable relative to the holder member 61 and the intermediate member 5.

The ferrule 54 shown in FIGS. 2 and 4 is made of plastic by injection molding. On a ferrule end face 77 of the ferrule 54, connection end faces of plural optical fiber core wires 7 of the multi-core fiber tape core wire 8 are arranged in series in the direction L. On the ferrule end face 77, guide holes 66 are formed in the direction S on both sides of the multi-core optical fiber core wires 7.

As shown in FIGS. 2 and 4, the holder member 61 and the intermediate member 5 are arranged outside the ferrule 54. The intermediate member 5 is the same member as the intermediate member 5 of the above-described male optical connector 1 and is formed of not plastic but metal. Examples of the metal material of the intermediate member 5 include iron, aluminum, and brass, but the invention is not particularly limited thereto. As the intermediate member 5 of the female optical connector 51, the same member as the intermediate member 5 of the male optical connector 1 may be used. The intermediate member 5 is fixed to the outer surface of the holder member 61 by the elastic force, for example.

The plug 56 covers the outer surface of the intermediate member 5, as shown in FIG. 2, and can slide against an urging force of a spring (not shown) in the direction T along a guide rail formed in the holder member 61, for example. The plug 56 has a spatial part with a substantially rectangular cross-section surface. A gripping part 86 is formed in the middle portion of the plug.

When the connection end faces of the multi-core optical fiber core wires 7 of the male optical connector 1 shown in FIG. 1 are optically connected to the connection end faces of the multi-core optical fiber core wires 7 of the female optical connector 51, the guide pins 9 and 9 of the male optical connector 1 are respectively inserted into the guide holes 66 and 66 of the female optical connector 51 for positioning.

An exemplary configuration of the intermediate member 5 will be described with reference to FIGS. 5 to 8.

Figure 5:
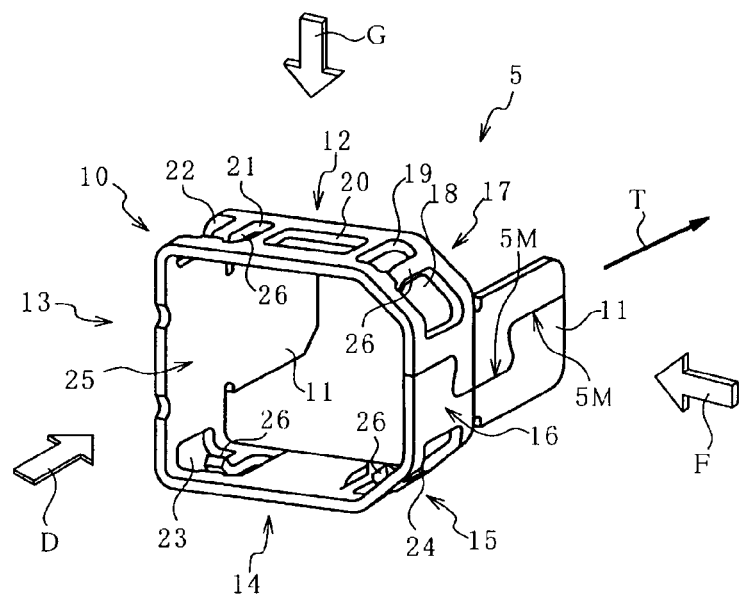
FIG. 5 is a perspective view illustrating an intermediate member.
Figure 6:
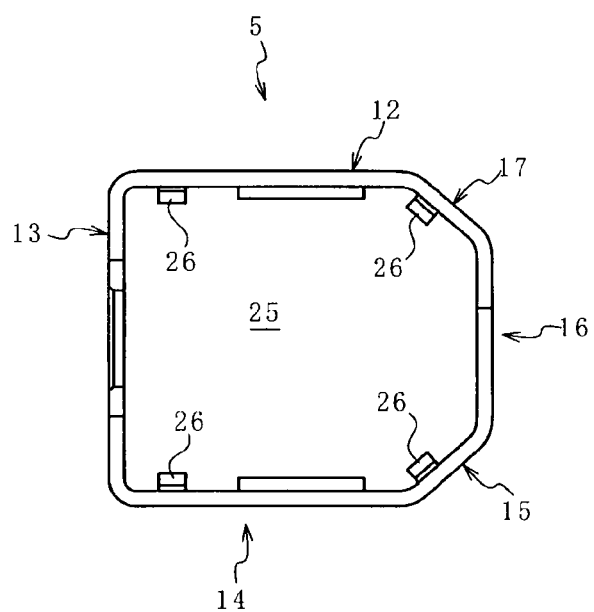
FIG. 6 is a front view illustrating the intermediate member shown in FIG. 5, when viewed in a direction D.
Figure 7:
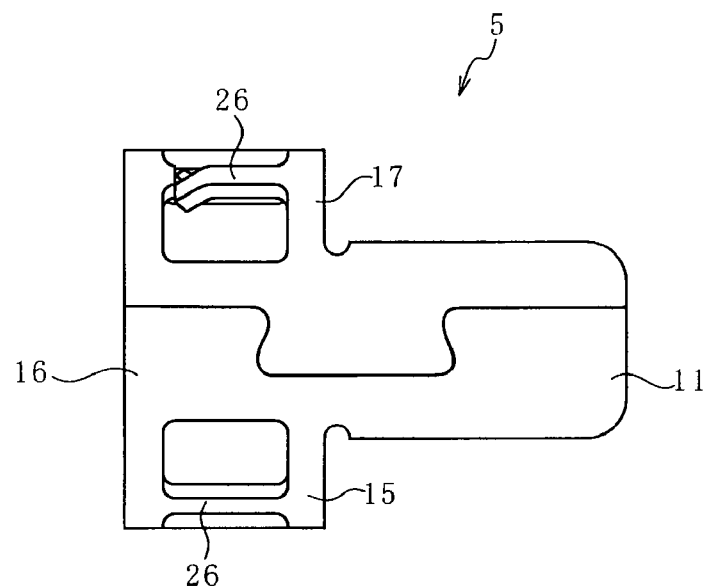
FIG. 7 is a side view illustrating the intermediate member shown in FIG. 6, when viewed in a direction F.
Figure 8:
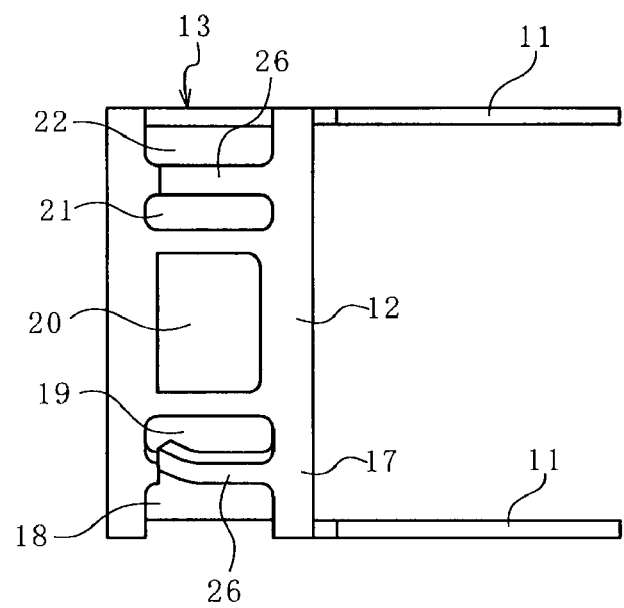
FIG. 8 is a plan view illustrating the intermediate member shown in FIG. 7, when viewed in a direction G.

FIG. 5 is a perspective view illustrating the intermediate member 5. FIG. 6 is a front view illustrating the intermediate member 5 shown in FIG. 5, when viewed in a direction D. FIG. 7 is a side view illustrating the intermediate member 5 shown in FIG. 5, when viewed in a direction F. FIG. 8 is a plan view illustrating the intermediate member 5 shown in FIG. 5, when viewed in a direction G.

As shown in FIGS. 5 to 8, the intermediate member 5 is formed by punching and bending the metal plate and by combining protrusion joining parts 5M and 5M. The intermediate member 5 includes a frame 10 with a substantially rectangular cross-section and extension parts 11.

The frame 10 includes side surface parts 12, 13, 14, 15, 16, and 17. Hole parts 18, 19, 20, 21, and 22 are formed in the side surface parts 17, 12, and 13. A hole part 23 is formed in the side surface parts 13 and 14. A hole part 24 is formed in the side surface parts 14, 15, and 16.

The frame 10 includes plural spring parts 26 to be fixed by the elastic force to the holder member 61 shown in FIG. 1. The spring parts 26 protrude toward the inside of the frame 10. As shown in FIGS. 3 and 4, the holder member 61 passes through an opening part 25 formed in the frame 10. The extension parts 11 protrude from the side surface parts 13 and 16 in the direction T and extend in parallel.

By holding the gripping parts 26 and 86 with fingers of an user and inserting the guide pins 9 and 9 of the optical connector 1 into the guide holes 66 and 66 of the optical connector 51, the multi-core fiber core wires 7 of the optical connector 1 shown in FIG. 1 and the optical connector 51 shown in FIG. 2 can be reliably connected to each other.

According to the embodiment of the invention, the optical connector includes the plastic ferrule holding the optical fibers, the plastic holder member holding the ferrule, the plastic plug arranged outside the holder member, and the metal intermediate member arranged between the outer surface of the holder member and the inner surface of the holder member.

Thus, even when the intermediate member is configured to be thinned, by forming the intermediate member of metal, the strength of the intermediate member can be ensured. Therefore, since the metal intermediate member is warped or distorted less than a plastic intermediate member, the ferrule, the intermediate member, and the plug can be readily assembled.

Even when ferrules with different sizes are used, the size of the intermediate member has only to be changed without modifying the shape of the plug.

The ferrule holds the optical fiber core wires of the multi-core fiber tape core wire. With such a configuration, the optical connector holding the multi-core fiber core wire can be readily assembled.

The intermediate member is a metal frame formed by bending a metal plate. Thus, the intermediate member can be formed with high precision by simply bending the metal plate.

The invention is not limited to the above-described embodiment, but may be modified in various forms.

For example, in the above-described embodiment, the connection end faces of the multi-core optical fiber core wires 7 of the male optical connector 1 are optically connected to the connection end faces of the multi-core optical fiber core wires 7 of the male optical connector 51.

However, the multi-core optical fiber core wires 7 of the male optical connector 1 may be connected to an adapter (not shown), or the multi-core optical fiber core wires 7 of the male optical connector 51 may be connected to an adapter (not shown).

The ferrule holds the multi-core optical fiber core wires, but the ferrule may hold a single-core optical fiber core wire.

The invention claimed is:

1. An optical connector that connects optical fibers to each other, comprising:
    a plastic ferrule that holds the optical fibers;
    a plastic holder member that holds the ferrule;
    a plastic plug that is arranged outside the holder member; and
    a metal intermediate member that is disposed between an outer surface of the holder member and an inner surface of the plug.

2. The optical connector according to claim 1,
    wherein the ferrule holds an optical fiber core wire of a multi-core fiber tape core wire.

3. The optical connector according to claim 1 or 2,
    wherein the intermediate member is formed by bending a metal plate.

\* \* \* \* \*